Jan. 14, 1958
W. PETERSEN
2,819,507
SHEET HOLDING CLAMP
Filed June 25, 1956
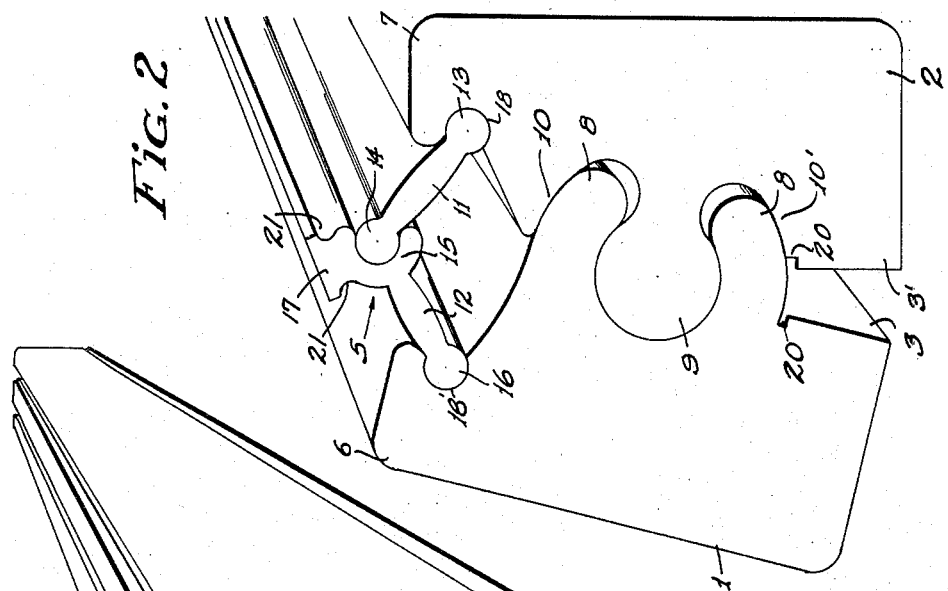
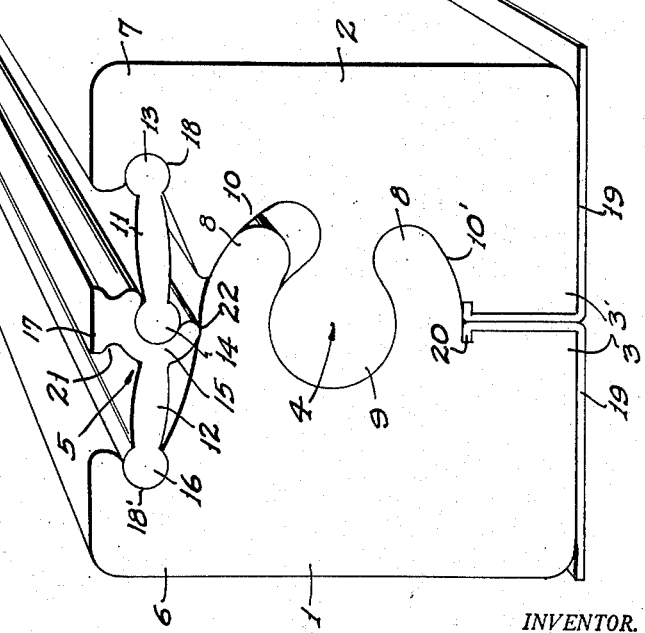
INVENTOR.
WILLIAM PETERSEN
BY
*Lynn H. Latta*
-ATTORNEY-

United States Patent Office 2,819,507
Patented Jan. 14, 1958

2,819,507

SHEET HOLDING CLAMP

William Petersen, Los Angeles, Calif.

Application June 25, 1956, Serial No. 593,514

4 Claims. (Cl. 24—250)

This invention relates to clamps and particularly to sheet metal clamps.

While the clamp of my invention may be used as a work holder in riveting or welding operations, the invention contemplates, as its primary use, the incorporation of the clamp in a fabricated structure (e. g. a temporary structure such as a knock-down building for use in military field operations, or a mock-up of an airplane or other apparatus embodying sheet metal panels fitted to one another over large areas, etc.).

The primary object of this invention is the provision of a means whereby two pieces of metal may be easily clamped together and just as easily released.

Another object of this invention is the provision of a clamp which can readily be fabricated in any number of sizes without increasing production costs.

Specifically, the invention contemplates a clamp fabricated from inexpensive extruded metal parts (e. g. aluminum, brass, steel, etc.).

Other objects and advantages will become apparent in the following specification as read in connection with the accompanying drawing in which:

Fig. 1 is a perspective view of a clamp embodying the invention with the jaws clamped upon two pieces of metal which are in position for welding;

Fig. 2 is a fragmentary view showing the position of the various parts when the jaws are open.

Referring now to the drawing in detail, the clamp comprises two complementary clamp sections 1 and 2, at one end of which are jaws 3, 3', and which rotate about an intermediate axis indicated generally at 4. At the other end of the clamp is a toggle mechanism indicated generally by 5 which acts upon two lever arms 6 and 7 to force the jaws of the clamp together.

The clamp hinges upon two hinge lips, 8, 8, incorporated into clamp section 1, which fit between hinge tongue 9 and bearing shoulders 10, 10', incorporated into clamp section 2.

The toggle mechanism comprises a link 11, having two knuckles 13 and 14, and a link 12 having a knuckle 16 and a socket 15 with an integral head 17. Knuckle 13 mates within socket 18 in lever arm 7 and knuckle 16 mates within socket 18' in lever arm 6, while socket 14 mates within socket 15 in link 12.

The jaws 3, 3' clamp upon two sections of sheet metal 19 to be welded, which are pre-formed to fit into slots 20, 20' which hold the metal in position whilst the jaws are being closed.

As shown in Fig. 2, the toggle apparatus 5 has been moved to a raised position, causing the hinge lips 8, 8 to pivot about the hinge tongue 9 and within the bearing shoulders 10, 10', and opening the jaws 3, 3'.

As pressure is applied to head 17, the links 11 and 12 are forced downwardly and are spread, the lever arms 6 and 7 being thereby moved outwardly, bringing the jaws 3, 3' together. Because of the lever action involved in the movement of the toggle mechanism, great pressure can be exerted on the jaws of the clamp with comparatively small force upon the head 17.

The toggle mechanism is pushed downwardly until the bottom of socket 15 rests on the upper edge of hinge lip 8 at point 22. The knuckle 14 and socket 15 assembly is allowed to pass slightly past the center line between sockets 18 and 18' producing a locking effect upon the clamp to hold it tightly closed.

A groove 21 is provided along each side of head 17 into which a screwdriver or some such instrument or tool may be inserted to engage beneath the head 17 so as to unlock the toggle mechanism and open the clamp.

I claim:

1. A clamp of the type described, comprising: two complementary clamp sections each having a jaw at one end and at its other end a lever arm provided with a socket; a pair of arcuate hinge lips embodied in one of said sections; a hinge tongue and a pair of opposed arcuate bearing shoulders embodied in the other section, said tongue having a segmental cylindrical bearing wall and said shoulders and lips being coaxial and fitted to said tongue on the longitudinal axis of said tongue, said clamp section being rotatable about said axis; and a toggle mechanism comprising two adjoining links, one of said links having a knuckle at one end and a socket at the other end the adjoining link having at each end a knuckle, one of which is received in said socket of said one link, whereby said links are joined, the remaining knuckles mating within said lever arm sockets, said toggle mechanism forcing said lever arms apart as downward pressure is brought to bear on said toggle mechanism, whereby said jaws are forced together for clamping pieces of sheet metal together.

2. A clamp as described in claim 1, wherein said lever arms, jaws, hinge tongue and hinge lips are extruded metal parts, and wherein said clamp parts are uniform throughout any selected length for the clamp.

3. A clamp as described in claim 2, wherein said toggle links are extruded metal parts and wherein said clamp parts are uniform throughout any selected length for the clamp.

4. A clamp as described in claim 3, where said toggle link socket has an integral head with a groove along each side of said head.

References Cited in the file of this patent

UNITED STATES PATENTS 1,753,058    Morrison _____ Apr. 1, 1930